(12) United States Patent
Alvarez

(10) Patent No.: US 10,155,557 B2
(45) Date of Patent: Dec. 18, 2018

(54) FLEXIBLE DEVICE FOR PROVIDING A SAFE ZONE AROUND A TWO-WHEELED VEHICLE

(71) Applicant: Manuel H. Alvarez, Santa Ana, CA (US)

(72) Inventor: Manuel H. Alvarez, Santa Ana, CA (US)

( * ) Notice: Subject to any disclaimer, the term of this patent is extended or adjusted under 35 U.S.C. 154(b) by 0 days.

(21) Appl. No.: 15/449,984

(22) Filed: Mar. 5, 2017

(65) Prior Publication Data
US 2018/0251177 A1 Sep. 6, 2018

(51) Int. Cl.
*B62J 6/00* (2006.01)
*B62J 27/00* (2006.01)
*B60Q 1/30* (2006.01)

(52) U.S. Cl.
CPC ............... *B62J 6/00* (2013.01); *B60Q 1/30* (2013.01); *B62J 27/00* (2013.01); *B62J 2300/008* (2013.01)

(58) Field of Classification Search
CPC ...... B60Q 1/30; B60Q 1/32; B62J 6/20; B62J 27/00
USPC .......... 116/28 R, 30, 35 A, 35 R, 46, 51, 52; 280/288.4
See application file for complete search history.

(56) References Cited

U.S. PATENT DOCUMENTS

| | | | | |
|---|---|---|---|---|
| 3,945,336 A | * | 3/1976 | Harris | B62J 27/00 116/28 R |
| 3,967,575 A | * | 7/1976 | Coutts | B62J 27/00 116/35 A |
| 3,972,302 A | * | 8/1976 | Sherman | B62J 27/00 116/28 R |
| 3,982,771 A | * | 9/1976 | Tropeano | B62J 6/20 116/35 R |
| 4,005,874 A | * | 2/1977 | Ohtani | B62J 6/20 116/28 R |
| 4,342,280 A | * | 8/1982 | Ashworth | B62J 6/20 116/202 |
| 4,422,615 A | * | 12/1983 | McManus | B62J 6/20 248/229.11 |
| 4,575,189 A | * | 3/1986 | Johnson | B62J 6/20 116/35 A |

(Continued)

FOREIGN PATENT DOCUMENTS

| | | | | |
|---|---|---|---|---|
| DE | 685405 C | * | 12/1939 | ............... B62J 6/20 |
| JP | 07052855 A | * | 2/1995 | ............... B62J 6/20 |
| JP | 2006001419 A | * | 1/2006 | ............... B62J 6/20 |

*Primary Examiner* — Richard A Smith
(74) *Attorney, Agent, or Firm* — Sandra Thompson; Finlayson Toffer Roosevelt & Lilly LLP

(57) ABSTRACT

A removable safety device for a two-wheeled vehicle has been developed having a frame, a handlebar and a pedal or footrest, wherein the device comprises a solid, but flexible, distance indicator having a first end, a second end and a body section, a coupling joint having a first side and a second side, wherein the first side is connected to the second end of the distance indicator and the second side is designed to be coupled with a frame of the two-wheeled vehicle; and wherein the distance indicator, when coupled with a point on the frame of the two-wheeled vehicle, extends away from the vehicle at a 90° angle from the vehicle and comprises a length that is longer than the distance between a point in the middle of the vehicle frame and either an outer point on the handlebar, the pedal, or the footrest.

10 Claims, 3 Drawing Sheets

(56) References Cited

U.S. PATENT DOCUMENTS

| | | | | |
|---|---|---|---|---|
| 4,586,454 A | * | 5/1986 | Hedquist et al. | B62J 6/20 |
| | | | | 116/28 A |
| 5,933,076 A | * | 8/1999 | Babb | B62J 6/005 |
| | | | | 200/61.27 |
| 6,374,766 B1 | * | 4/2002 | Clark | B60Q 1/30 |
| | | | | 116/173 |
| 6,808,298 B2 | * | 10/2004 | Christensen | B62J 6/005 |
| | | | | 340/468 |

* cited by examiner

FLEXIBLE DEVICE FOR PROVIDING A SAFE ZONE AROUND A TWO-WHEELED VEHICLE

FIELD OF THE SUBJECT MATTER

The field of the subject matter is a flexible device that is removable and easily installed on a two-wheeled vehicle, such as a bicycle, a scooter, a motorcycle or any other suitable two-wheeled vehicle that shares the road with cars and trucks.

BACKGROUND

Every year, there are thousands of people who ride bicycles, scooters and motorcycles who are injured, seriously injured or killed in road accidents. Many of these accidents are the result of cars or trucks traveling too closely to the bike lane or too closely to the bike or motorcycle rider. In a number of accidents, either the motorist doesn't see the cyclist and rides into the path of the cyclist or sees the cyclist and doesn't realize how close the car or truck is to the cyclist.

Cyclists usually try to solve the problem of not being seen by a motorist by using flashing lights or wearing bright, neon or reflective clothing. While these efforts may work at dusk or at night, cyclists are still left vulnerable during the day when lights are not as effective and reflective coating is not as prominent. Therefore, at the very least, a better solution is needed during the day.

To this end, it would be desirable to develop and utilize a removable and flexible device that can be easily installed on a bicycle, scooter, motorcycle or any other two-wheeled vehicle that shares the road with cars and trucks. It would also be desirable to ensure that contemplated devices are bright, reflective or otherwise produced in colors, fabrics and materials that are easily visible during morning, day, dusk and night.

SUMMARY OF THE SUBJECT MATTER

A removable safety device for a two-wheeled vehicle has been developed having a frame, a handlebar and a pedal or footrest, wherein the device comprises a solid, but flexible, distance indicator having a first end, a second end and a body section, a coupling joint having a first side and a second side, wherein the first side is connected to the second end of the distance indicator and the second side is designed to be coupled with a frame of the two-wheeled vehicle; and wherein the distance indicator, when coupled with a point on the frame of the two-wheeled vehicle, can extend away from the vehicle at a 90° angle from the vehicle or can be stored upright at about a 0° angle from the vehicle, and comprises a length that is longer than the distance between a point in the middle of the vehicle frame and either an outer point on the handlebar, the pedal, or the footrest.

Methods of mounting and utilizing a removable safety device comprise: providing a two-wheeled vehicle that has a frame, a handlebar and a pedal or footrest, providing a removable safety device, wherein the device comprises a solid, but flexible, distance indicator having a first end, a second end and a body section, a coupling joint having a first side and a second side; connecting the first side to the second end of the distance indicator, wherein the second side is designed to be coupled with a frame of the two-wheeled vehicle; and coupling the distance indicator with a point on the frame of the two-wheeled vehicle, so that the distance indicator extends away from the vehicle at a 90° angle from the vehicle and comprises a length that is longer than the distance between a point in the middle of the vehicle frame and either an outer point on the handlebar, the pedal, or the footrest.

BRIEF DESCRIPTION OF THE FIGURES

Once it is engaged.

DETAILED DESCRIPTION

A removable and flexible device has been developed that can be easily installed on a bicycle, scooter, motorcycle or any other two-wheeled vehicle that shares the road with cars and trucks. Contemplated devices are bright, reflective or otherwise produced in colors, fabrics and materials that are easily visible during morning, day, dusk and night.

Figure 1:
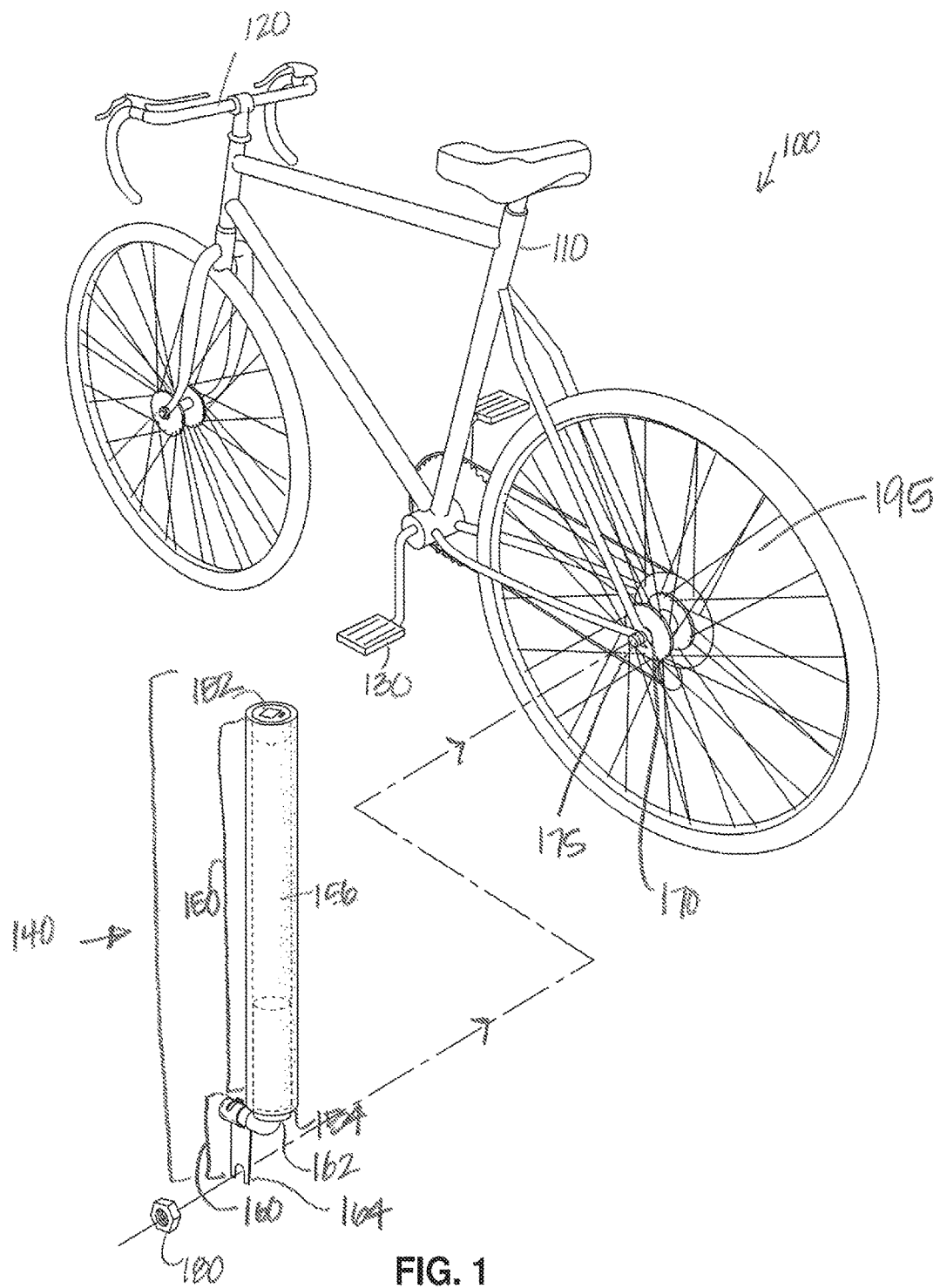
FIG. 1 shows a bicycle wherein a contemplated device is being connected to the frame.

Specifically, a removable safety device 140 for a two-wheeled vehicle has been developed and is shown in FIG. 1, wherein the two-wheeled vehicle 100 has a frame 110, a handlebar 120 and a pedal or footrest 130, wherein the device 140 comprises a solid, but flexible, distance indicator 150 having a first end 152, a second end 154 and a body section 156, a coupling joint 160 having a first side 162 and a second side 164, wherein the first side 162 is connected to the second end 154 of the distance indicator 150 and the second side 164 is designed to be coupled with a frame 100 of the two-wheeled vehicle 100; and wherein the distance indicator 150, when coupled with a point 170 on the frame or a portion of the frame 110 of the two-wheeled vehicle 100 using a coupling component 180, which in this Figure is a nut that was already being used to hold the tire assembly 195 onto the frame 110, and the device extends away from the vehicle at a 90° angle from the vehicle (shown in FIG. 3) and comprises a length that is longer than the distance between a point in the middle of the vehicle frame and either an outer point on the handlebar, the pedal, or the footrest. In some embodiments, the distance indicator can be rotated and stored upright at about a 0° angle from the vehicle when the vehicle is not in use or when use of the distance indicator isn't necessary (shown in FIG. 3). In FIG. 1, the second side 164 has an arched shape that is designed to fit over a bolt 175 on the tire assembly 195.

Methods of mounting and utilizing a removable safety device is also shown in FIG. 1 and comprises: providing a two-wheeled vehicle that has a frame, a handlebar and a pedal or footrest, providing a removable safety device, wherein the device comprises a solid, but flexible, distance indicator having a first end, a second end and a body section, a coupling joint having a first side and a second side; connecting the first side to the second end of the distance indicator, wherein the second side is designed to be coupled with a frame of the two-wheeled vehicle; and coupling the distance indicator with a point on the frame of the two-wheeled vehicle, so that the distance indicator extends away from the vehicle at a 90° angle from the vehicle and comprises a length that is longer than the distance between a point in the middle of the vehicle frame and either an outer point on the handlebar, the pedal, or the footrest.

Figure 2:
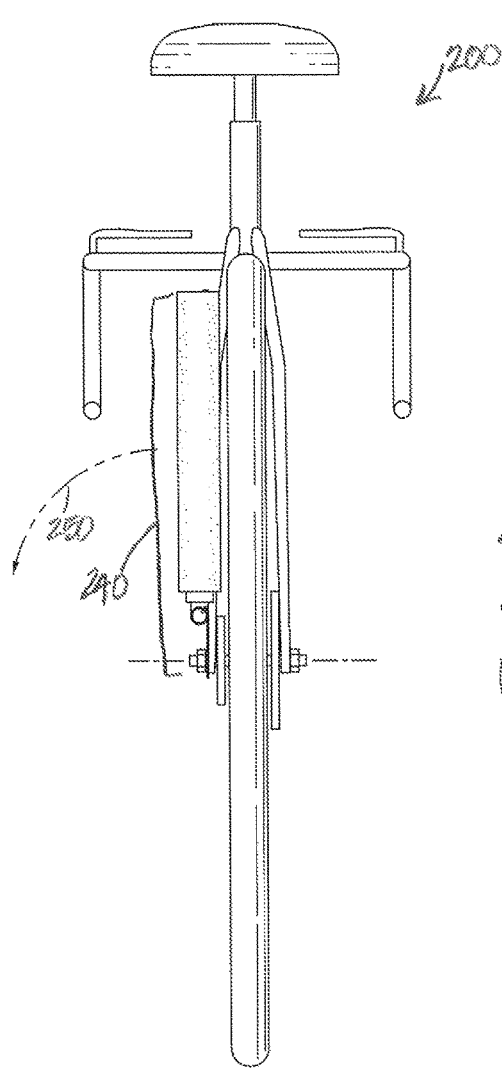
FIG. 2 shows a contemplated two-wheel vehicle 200 from the back of the vehicle.

In contemplated embodiments, suitable vehicles comprise any vehicle that has two or three wheels, and normally travels in a bike lane or has special regulations related to it, such as a bicycle, a scooter, a motorcycle or the like. Contemplated vehicles may be motorized or "powered by the rider", such as a bicycle. It should be understood that contemplated devices are designed to provide clear notice to the driver of a car or truck what a safe distance might be to remain from the contemplated vehicle when riding next to the two or three-wheeled vehicle or passing that same vehicle. As an example, FIG. 2 shows a contemplated two-wheel vehicle 200 from the back of the vehicle. In FIG. 2, the removable safety device 240 is stored upright at about a 0° angle from the vehicle. Note that the arrow 250 indicates how the removable safety device 240 can be lowered or engaged.

Figure 3:
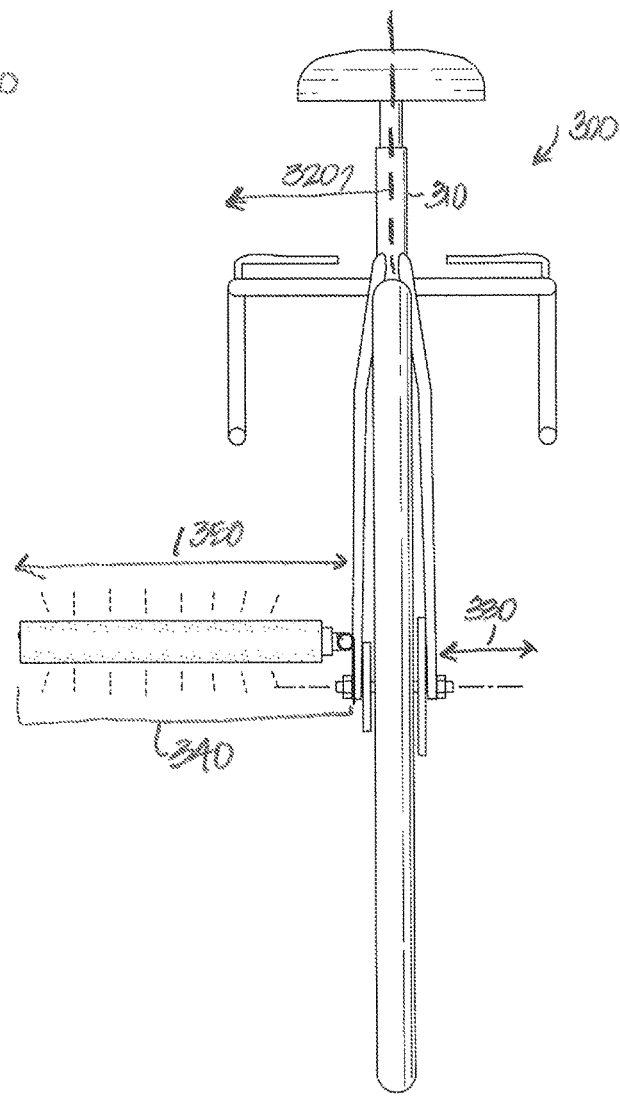
FIG. 3 shows a contemplated two-wheel vehicle 300 from the back of the vehicle, where the removable safety device 340 is at about a 90-degree angle from the vehicle.

Once it is engaged, FIG. 3 shows a contemplated two-wheel vehicle 300 from the back of the vehicle, where the removable safety device 340 is at about a 90-degree angle from the vehicle. Note that the removable safety device 340 comprises a length 350 that is longer than the distance between a point in the middle of the vehicle frame 310 and either an outer point on the handlebar 320, the pedal 330, or the footrest (not shown). FIG. 3 also shows dashed lines coming off of the distance indicator that are used to represent how the distance indicator may be lighted, may reflect light, or may glow in the dark.

Figures 4, 5, 6, 7:
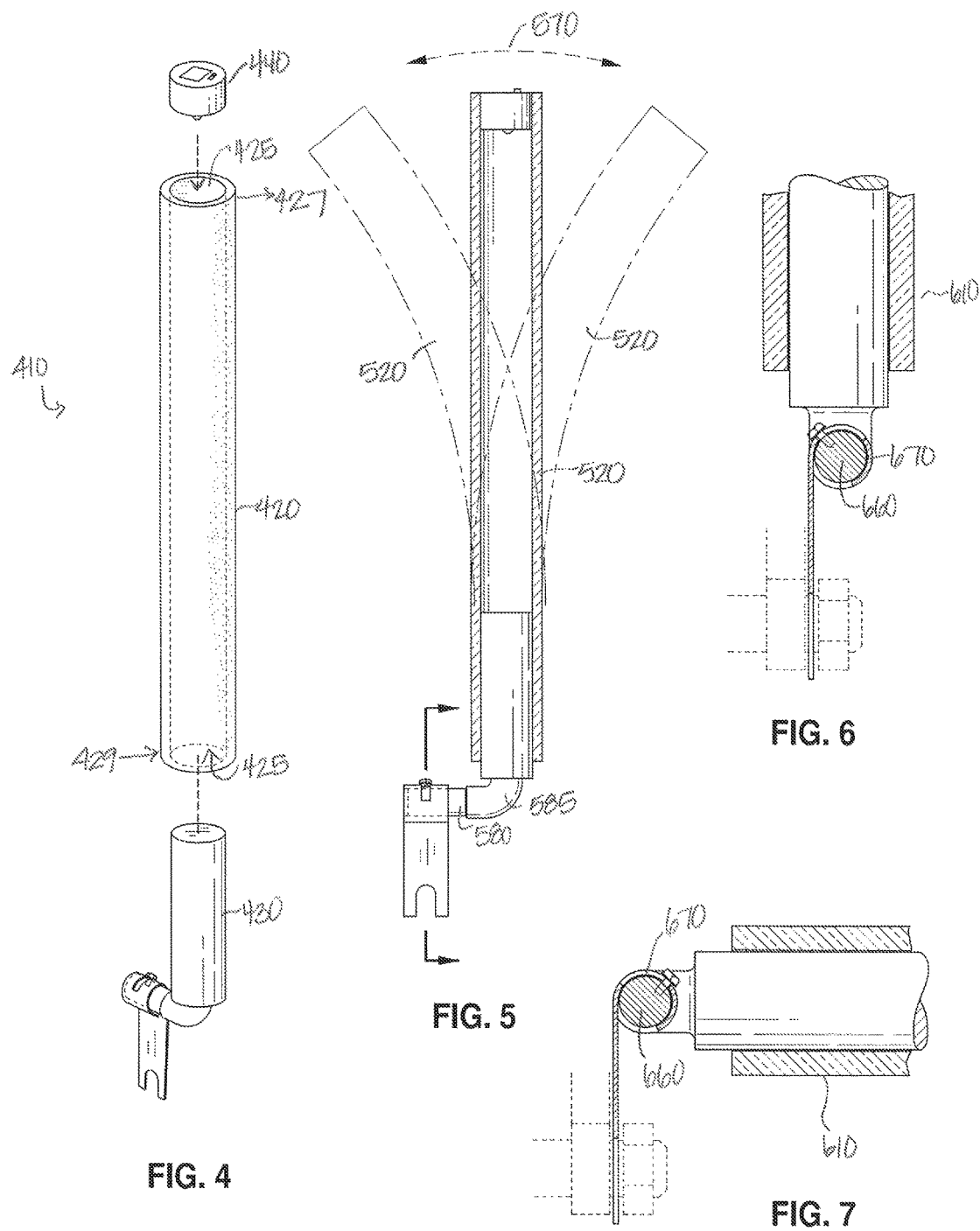
FIG. 4 shows a contemplated embodiment.
FIG. 5 shows the flexibility of a contemplated embodiment.
FIG. 6 shows a portion of the removable safety device 610, where a rotational assembly 650 is shown in action.
FIG. 7 also shows a portion of the removable safety device 610, where a rotational assembly 650 is shown in action.

Contemplated devices comprise a solid, but flexible, distance indicator that has a first end, a second end, and a body section, wherein the body section has a length. The flexibility aspect is shown in FIG. 5, where a contemplated distance indicator 520 is flexible as shown by the directional arrow 570. One reason that contemplated devices are flexible is that they need to be able to flex or "crumple" if the vehicle turns over or is in an accident. Rider safety is paramount with respect to contemplated embodiments. In some embodiments, the distance indicator may comprise a rectangular shape with four sides and a volume. In other embodiments, the distance indicator may comprise a flat shape with two sides.

FIG. 4 shows another contemplated embodiment of a removable safety device 410. In this embodiment, the distance indicator 420 is also removable, in that it can be mateably coupled with a base member 430, wherein the distance indicator 420 has an inner hollow core 425 that has a bottom 429 that is coupled in a female fashion with the base member 430 that is the male side of the mateable couple. Once the distance indicator 420 is coupled with the base member 430, a top member 440 can be mateably coupled in a male fashion with the top 427 of the inner hollow core 425 of the distance indicator 420.

FIG. 6 and FIG. 7 show a portion of the removable safety device 610, where a rotational assembly 650 is shown in action. In FIG. 6, the rotational assembly 650 has a solid component 660 (shown in FIG. 5 as 580) and a rotatable component 670 (shown in FIG. 5 as 585). In FIG. 6, the end of the solid component 660 and the end of the rotatable component 670 are shown. The same is shown in FIG. 7. The difference in the two Figures is how the removable safety device 610 rotates from a 0-degree angle to a 90-degree angle relative to the two-wheeled vehicle frame (not shown in full, but instead partially shown by the dashed lines that represents a portion of the tire assembly).

Contemplated distance indicators may comprise any suitable material, fabric or combination thereof. In some embodiments, a distance indicator may comprise foam material or foam rubber alone or may comprise a foam material or foam rubber core that is surrounded by neon or reflective plastic or material. The material and/or fabric may also comprise any suitable texture, pattern or combination thereof, with the understanding that the texture, pattern or combination thereof will aid the driver of the car or truck in observing the distance indicator when approaching the two-wheeled or three-wheeled vehicle.

In contemplated embodiments, a coupling joint is including having a first side and a second side, wherein the first side is connected to the second end of the distance indicator and the second side is designed to be coupled with a frame of the two-wheeled or three-wheeled vehicle, as shown in FIG. 2. A contemplated coupling joint may comprise a clamping component, a magnetic component, a male/female coupling component or a combination of each of these. In most instances, a contemplated coupling joint is going to couple with the wheel hub or a part of the frame that stays relatively stationary when the vehicle is moving.

At this point, it is important to understand what the phrase "wherein the distance indicator, when coupled with a point on the frame of the two-wheeled vehicle, extends away from the vehicle at a 90° angle from the vehicle and comprises a length that is longer than the distance between a point in the middle of the vehicle frame and either an outer point on the handlebar, the pedal, or the footrest" means in the context of this description. If one is looking down on a motorcycle or a bicycle, it can be cut in half two ways—lengthwise or from back to front, and widthwise or from side to side. If the vehicle is cut in half lengthwise, there is one handlebar and one foot pedal or rest on each side. Therefore, there is a distance between the line down the middle of the vehicle and the outer point of or on the handlebar or the pedal/footrest, which is shown in FIG. 3. In this case, a contemplated distance indicator comprises a length that is longer than the longest of the two lengths from the center line to the outer point of the handlebar or from the center line to the outer point of the foot pedal or rest.

Thus, specific embodiments and methods of use of a flexible device that is removable and easily installed on a two-wheeled vehicle, such as a bicycle, a scooter, a motorcycle or any other suitable two-wheeled vehicle that shares the road with cars and trucks have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A removable safety device for a two-wheeled vehicle having a frame, a handlebar and a pedal or footrest, the device comprising:
   a solid, but flexible, distance indicator having a first end, a second end and a body section, wherein the distance indicator comprises a hollow inner core, a bottom and a top;
   a coupling joint having a first side and a second side, wherein the first side is connected to the second end of the distance indicator and the second side is designed to be coupled with a frame of the two-wheeled vehicle; and
   wherein the distance indicator, when coupled with a point on the frame of the two-wheeled vehicle, extends away from the vehicle at a 90° angle from the vehicle and comprises a length that is longer than the distance between a point in the middle of the vehicle frame and either an outer point on the handlebar, the pedal, or the footrest, and wherein the inner hollow core of the distance indicator is coupled in a female fashion to a base member.

2. The removable safety device of claim 1, wherein the distance indicator is rotatably stored upright at about a 0-degree angle from the vehicle.

3. The removable safety device of claim 1, further comprising a rotational assembly.

4. The removable safety device of claim 3, wherein the rotational assembly comprises a solid component and a rotatable component.

5. The removable safety device of claim 4, wherein the rotational assembly comprises the base member.

6. The removable safety device of claim 1, wherein the second side of the coupling joint has an arched shape that is designed to fit over a bolt on a tire assembly that is part of the two-wheeled vehicle.

7. The removable safety device of claim 1, wherein the distance indicator comprises a material that allows the distance indicator to be flexible.

8. The removable safety device of claim 1, wherein the base member is removably coupled with the two-wheeled vehicle.

9. The removable safety device of claim 1, wherein a top member is coupled in a male fashion with the top of the inner hollow core of the distance indicator.

10. A removable safety device for a two-wheeled vehicle having a frame, a handlebar and a pedal or footrest, the device comprising:
    a solid, but flexible, distance indicator having a first end, a second end and a body section, wherein the distance indicator comprises a hollow inner core, a bottom and a top;
    a coupling joint having a first side and a second side, wherein the first side is connected to the second end of the distance indicator and the second side is designed to be coupled with a frame of the two-wheeled vehicle; and
    wherein the distance indicator, when coupled with a point on the frame of the two-wheeled vehicle, extends away from the vehicle at a 90° angle from the vehicle and comprises a length that is longer than the distance between a point in the middle of the vehicle frame and either an outer point on the handlebar, the pedal, or the footrest, and wherein the inner hollow core of the distance indicator is coupled in a male fashion to a base member.

* * * * *